US007493610B1

(12) United States Patent
Onodera et al.

(10) Patent No.: US 7,493,610 B1
(45) Date of Patent: Feb. 17, 2009

(54) VERSIONING OPTIMIZATION FOR DYNAMICALLY-TYPED LANGUAGES

(75) Inventors: Tamiya Onodera, Tokyo (JP); Vijay Sundaresan, Ontario (CA); Michiaki Tatsubori, Kanagawa-ken (JP); Akihiko Tozawa, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/056,726

(22) Filed: Mar. 27, 2008

(51) Int. Cl.
*G06F 9/45* (2006.01)
*G06F 11/00* (2006.01)

(52) U.S. Cl. .................. 717/155; 717/140; 717/151; 717/154; 714/38

(58) Field of Classification Search ............... 717/140, 717/151–161; 714/37, 38
See application file for complete search history.

(56) References Cited

U.S. PATENT DOCUMENTS

| | | | |
|---|---|---|---|
| 5,964,867 A * | 10/1999 | Anderson et al. ........... 712/219 |
| 6,026,241 A | 2/2000 | Chow et al. |
| 6,070,009 A | 5/2000 | Dean et al. |
| 6,170,083 B1 | 1/2001 | Adl-Tabatabai |
| 6,189,141 B1 * | 2/2001 | Benitez et al. ............. 717/153 |
| 6,374,367 B1 | 4/2002 | Dean et al. |
| 6,745,384 B1 | 6/2004 | Biggerstaff |
| 6,857,118 B2 * | 2/2005 | Karr et al. ................... 717/114 |
| 6,925,640 B2 * | 8/2005 | Allison ....................... 717/165 |
| 6,938,249 B2 | 8/2005 | Roediger et al. |
| 6,961,874 B2 * | 11/2005 | Lodrige ....................... 714/38 |
| 6,964,043 B2 | 11/2005 | Wu et al. |
| 6,968,542 B2 * | 11/2005 | Bagley et al. ............... 717/139 |
| 6,973,646 B1 | 12/2005 | Bordawekar et al. |
| 6,993,757 B2 | 1/2006 | Rajagopalan |
| 7,010,785 B2 * | 3/2006 | Haber et al. ................ 717/151 |
| 7,058,935 B2 | 6/2006 | Kawahito et al. |
| 7,058,936 B2 | 6/2006 | Chilimbi et al. |
| 7,086,043 B2 * | 8/2006 | Roediger et al. ............ 717/150 |
| 7,213,242 B2 * | 5/2007 | Robison ....................... 717/151 |
| 7,219,329 B2 | 5/2007 | Meijer et al. |
| 7,275,242 B2 | 9/2007 | Liu et al. |

(Continued)

OTHER PUBLICATIONS

Cohn et al., "Hot Cold Optimization of Large Window/NT Applications," Dec. 1996, IEEE, p. 80-89.*

(Continued)

*Primary Examiner*—Wei Y. Zhen
*Assistant Examiner*—Qing Chen
(74) *Attorney, Agent, or Firm*—Keusey, Tutunjian & Bitetto, P.C.; Vazken Alexanian

(57) ABSTRACT

A system and method for optimizing program code in dynamic languages includes gathering hot-type information from a program by employing inferencing or profiling to get the hot-type information for operator uses, and inserting guards in the program based on data flow in the program to guard against propagation failures during runtime where preconditions are violated or where the propagation is unlikely to return. The program is versioned into global versions including a hot path version and a cold path version, where the hot path version is expected to be executed if the values of variables in the code are expected types, and other exceptional cases are handled by the cold path version as triggered by the guards. Compiler optimizations are performed to remove redundant representations of values, and heavy overloading of operators to provide an optimized compiling of the code.

1 Claim, 5 Drawing Sheets

U.S. PATENT DOCUMENTS

| | | | |
|---|---|---|---|
| 7,289,947 B2 | 10/2007 | Ammons | |
| 7,389,522 B1 | 7/2008 | Komatsu et al. | |
| 2002/0170043 A1* | 11/2002 | Bagley et al. | 717/153 |
| 2003/0048122 A1 | 3/2003 | Kazi | |
| 2003/0097648 A1* | 5/2003 | Allison | 717/114 |
| 2003/0101433 A1* | 5/2003 | Allison | 717/116 |
| 2003/0208749 A1 | 11/2003 | Rajagopalan | |
| 2004/0015918 A1* | 1/2004 | Kawahito et al. | 717/151 |
| 2004/0216085 A1 | 10/2004 | Wilson et al. | |
| 2005/0138611 A1* | 6/2005 | Inglis et al. | 717/151 |
| 2006/0005180 A1 | 1/2006 | Nefian et al. | |
| 2006/0036426 A1 | 2/2006 | Barr et al. | |
| 2006/0064682 A1 | 3/2006 | Tanaka | |
| 2006/0070047 A1 | 3/2006 | Narayansamy et al. | |
| 2007/0038978 A1 | 2/2007 | Meijer et al. | |
| 2007/0055978 A1 | 3/2007 | Meijer et al. | |
| 2007/0074185 A1 | 3/2007 | Meijer et al. | |
| 2007/0079298 A1 | 4/2007 | Tian et al. | |
| 2007/0240125 A1 | 10/2007 | Degenhardt et al. | |
| 2007/0277162 A1 | 11/2007 | Tanaka et al. | |
| 2007/0285271 A1 | 12/2007 | Erlingsson et al. | |

OTHER PUBLICATIONS

Suganuma et al., "A Region-Based Compilation Technique for a Java Just-in-Time Compiler," Jun. 2003, ACM, p. 312-323.*
Suganuma et al., "Region-Based Compilation Technique for Dynamic Compilers," Jan. 2006, ACM, p. 134-174.*

* cited by examiner

VERSIONING OPTIMIZATION FOR DYNAMICALLY-TYPED LANGUAGES

BACKGROUND

1. Technical Field

The present invention relates to optimization of code checking and more particularly to systems and methods for optimizing code for dynamically-typed computer languages.

2. Description of the Related Art

In dynamically-typed languages, we cannot statically, i.e., at compile time, distinguish primitive values, e.g., integers, from reference values representing pointers to data structures, e.g., objects. Instead primitive values and reference values need to be distinguished at runtime. In the prior art, types of values are dynamically distinguished in several ways. 1. Tag-bit solution: Includes a tag-bit field in a value indicating whether a value is primitive value, or a reference value. 2. Boxing solution: Primitive values are wrapped (boxed) by reference values, e.g., java.lang.Integer. 3. Some compilers also use the tag-word approach, e.g., Glasgow Haskell Compiler, or Icon.

Soft typing for LISP aims at removing runtime checks. However, soft typing does not remove more significant costs coming from 1) redundant representation of values, and 2) heavy overloading of operators. Some other techniques aim at optimizing representations of dynamic values. Untagging and unboxing are techniques that change the representation of objects when their types are known. The escape analysis technique is a similar technique to permit allocation of an object on a local frame. Many proposals of untagging, unboxing, or escape analysis have limitations when applied to dynamically typed languages. A basic problem in these techniques is that they cannot determine the type of variables where control flow merges, and where different types of values flow into the same variable.

Specialization and devirtualization aim at reducing the cost of calls by permitting specialized functions. Many dynamically typed languages have heavily-overloaded operators. Such overloading should be resolved before calls to such operators are employed or inlined. A similar problem to unboxing and untagging optimization may apply here as well.

SELF is a dynamically typed language, whose compiler uses a splitting optimization which duplicates some part of the control flow of the program for increasing the chance of specialization. In particular, SELF splits the control flow for specific types to achieve devirtualization and inlining. In SELF, each splitting incrementally and locally modifies the code so that it is difficult to control the final code after all splitting is applied. SELF's splitting causes explosion, and some heuristics are needed to avoid this problem.

Loop versioning can duplicate a loop to optimize one version of the loop. However, the effectiveness of loop versioning may be modest, e.g., removal of some array boundary checks inside the loop, which include several machine instructions. Region-based compilation selects a hot-path of the code using profiling, and compiles the code only for a hot path. Region-based compilation itself just skips the compilation of cold paths, so that it does not create a hot path by changing the control flow.

SUMMARY

In the present embodiments, runtime checks are exploited to provide more gains by removing costs of redundant representation of values, and heavy overloading of operators. This is provided using a form of versioning based on types. The versioning technique is not a local transformation of the code as the splitting technique in SELF. Instead, it includes a global rewrite of the code and is based on a global analysis. An explosion does not occur with the versioning technique in accordance with the present principles. The present embodiments create a hot path from a single combination of hot types, chosen by a global data flow analysis of the code. The hot path creation at most only doubles the code size. The present embodiments, as opposed to SELF, for example, provide optimization of value representation. The present embodiments use a novel form of loop versioning and region-based compilation. The present embodiments advantageously provide optimization representation, resolution of overloading and versioning.

A system and method for optimizing program code in dynamic languages includes gathering hot-type information from a program by employing at least one of inferencing and profiling to get the hot type information for operator uses, and inserting guards in the program based on data flow in the program to guard against propagation failures during runtime where preconditions are violated or where the propagation is unlikely to return. The program is versioned in its entirety into global versions including a hot path version and a cold path version, where the hot path version is expected to be executed if the values of variables in the code are expected types, and other exceptional cases are handled by the cold path version as triggered by the guards. Compiler optimizations are performed to remove redundant representations of values, and heavy overloading of operators to provide an optimized compiling of the code, and untagging and unboxing techniques may be combined, if needed, to obtain optimal representations.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
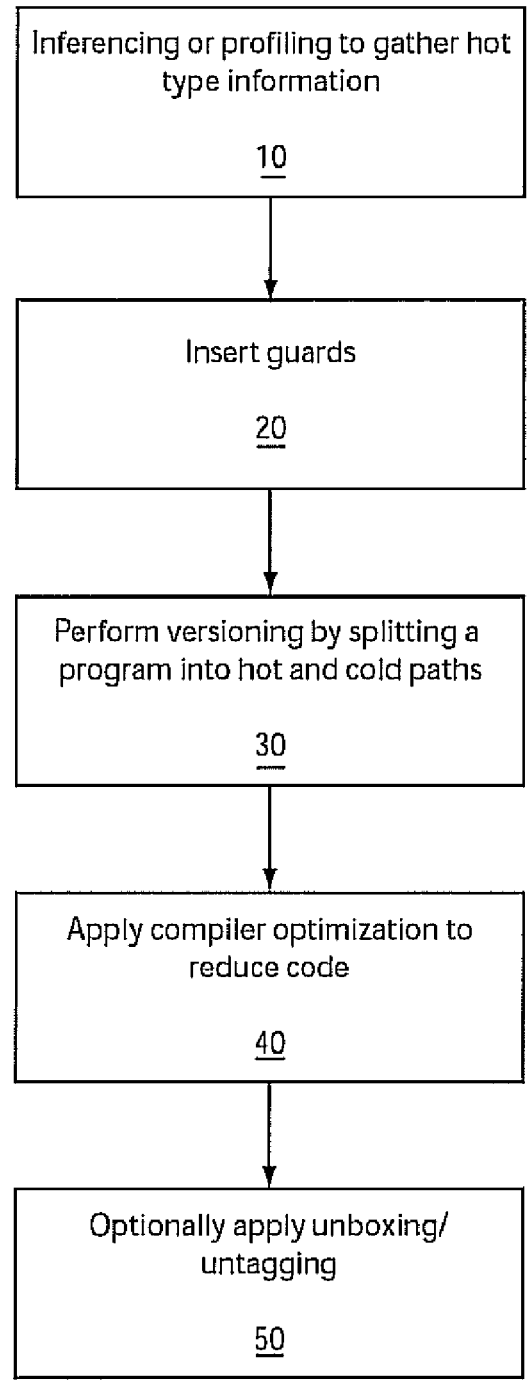
FIG. 1 is a block/flow diagram showing an optimizer/optimization method for dynamic language program code in accordance with the present principles.

The present principles provide systems and methods which target dynamically-typed languages, including LISP, Smalltalk, Ruby, PHP, etc. Such languages tend to perform worse than statically typed languages for largely two reasons: 1) Values are represented by heavier data structures, containing runtime type information; and 2) Primitive operators are heavily-overloaded, and are only resolved at runtime. Therefore, optimizing compiler technology is beneficial for removing these overheads by 1) optimizing the representation of values, and 2) increasing the chance of specialization, e.g., devirtualization, and inlining. All known proposals for optimizing dynamic languages suffer from some restrictions, which prevent them from obtaining performance comparable to statically-typed languages.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public-networks. Modems, cable modem and Ethernet cards are just a few of the currently available types of network adapters.

Referring now to the drawings in which like numerals represent the same or similar elements and initially to FIG. 1, a block/flow diagram shows an illustrative system/method for optimizing program code in accordance with the present principles. The present embodiments target any dynamically typed language including, e.g., PHP, SmallTalk, Ruby, etc., and implement a particular optimizer inside a compiler for this language. Given a target function to optimize in the compiler's internal representation, an optimizer 8 applies blocks 10-50 to the code.

In block 10, inferencing or profiling are employed to get hot type information of operator uses. In block 20, insertion of guards by a data flow is performed. We then combine block 10 and 20 with a known code transformation in blocks 30-50. In block 30, versioning is performed by splitting hot and cold paths. In block 40, known compiler optimizations are applied, e.g., inlining, constant unfolding, etc. In block 50, an optional unboxing/untagging technique may be employed.

These steps implement a versioning optimization which creates a hot path with a larger chance to: 1) optimize the representation of objects, and 2) increase the chance of specialization, e.g., devirtualization, and inlining. Furthermore, using a global analysis based on hot type information in blocks 10 and 20, the present versioning technique does not cause code explosion.

In the block 10, we collect the information about how operators are used inside a function. Here, 'hot types' capture the type of operator at a certain use site, which the runtime use of the operator is likely to obey. For example, the hot type of the following '+' operator can be INT x INT→INT, if the input $x of foo is likely to be INT (meaning integer).

Example:
foo ($x)
{ . . .
$z=1+$x
. . . }

Another note is that, in block 10, we need to collect sufficient information useful in the later blocks 20 and 30 and enabling the goals 1) and 2). For example, 'inlining' and 'specialization' are usually effective for simple scalar (arithmetic, boolean, etc.) operators, which once resolved, correspond to a few machine instructions. Also, the runtime representation of variable-sized heap objects (e.g., an array) cannot be optimized, unlike number and scalar values. Hence, we focus on scalar types when collecting hot type information.

The versioning optimization is to split the cold path and hot path in the program. However, before doing the actual transformation, we first have to determine when to execute the cold path. This is done in block 20. Here we may employ a DFA— (Data Flow Analysis) algorithm to propagate the type information. During DFA, we insert 'guards' to the hot path of the code when type conflicts are found during the type propagation. The guards are checked at runtime, and if the check fails, the control transfers to a corresponding part of the cold path.

In block 30, code duplication takes place. This is similar to existing versioning optimizers. This step is described with respect to FIG. 2.

Figure 2:
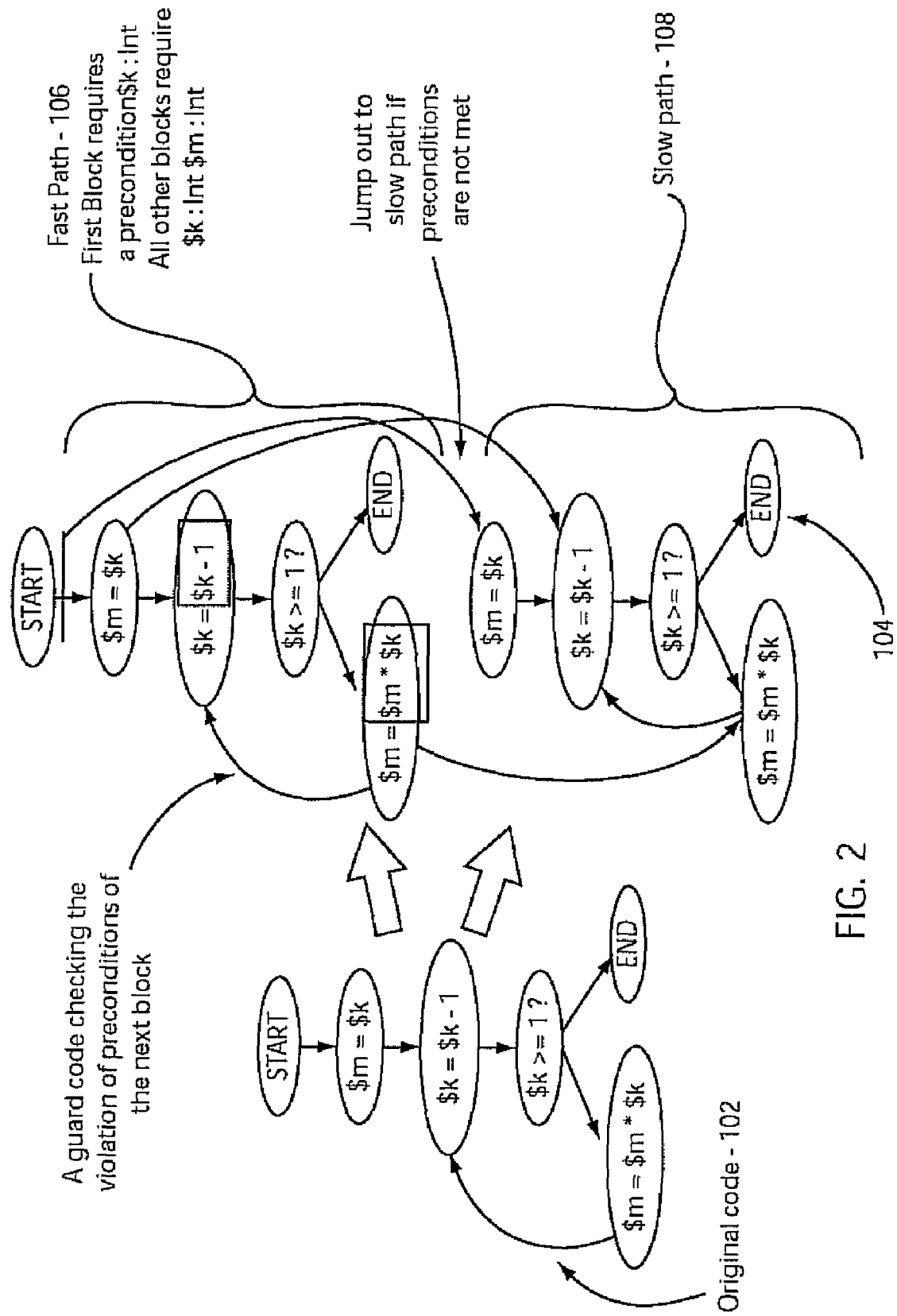
FIG. 2 is a diagram showing versioning and applying guards in program code in accordance with an illustrative embodiment.

Referring to FIG. 2, a diagram showing exemplary program code for carrying out the steps of the present invention is illustratively depicted. Original code 102 creates new versions 104 for verifying the code. Once the hot-path 104 is created, we can use known optimizations. Now the types of the operators in hot-paths are likely to be statically determined, so that we can apply existing technologies like devirtualization and inlining (see block 40, FIG. 1). Also, if the object model is a tag-word model, many scalar values will be translated into optimal machine representations, by exploiting constant propagation and dead store elimination. If the object model uses a tag bit model or boxing model to represent scalar values, we combine the untagging and unboxing techniques to obtain the optimal representations (see block 50, FIG. 1).

A versioning technique of the present invention identifies typical types of variables in the program 102, and duplicates the code (control flow graph) into two paths, a hot path (fast) 106 and a cold path (slow) 108. The hot path 106 is expected to be executed if the values of the variables are of the expected typical types, and the other exceptional cases are handled by the cold path 108.

Figure 3:
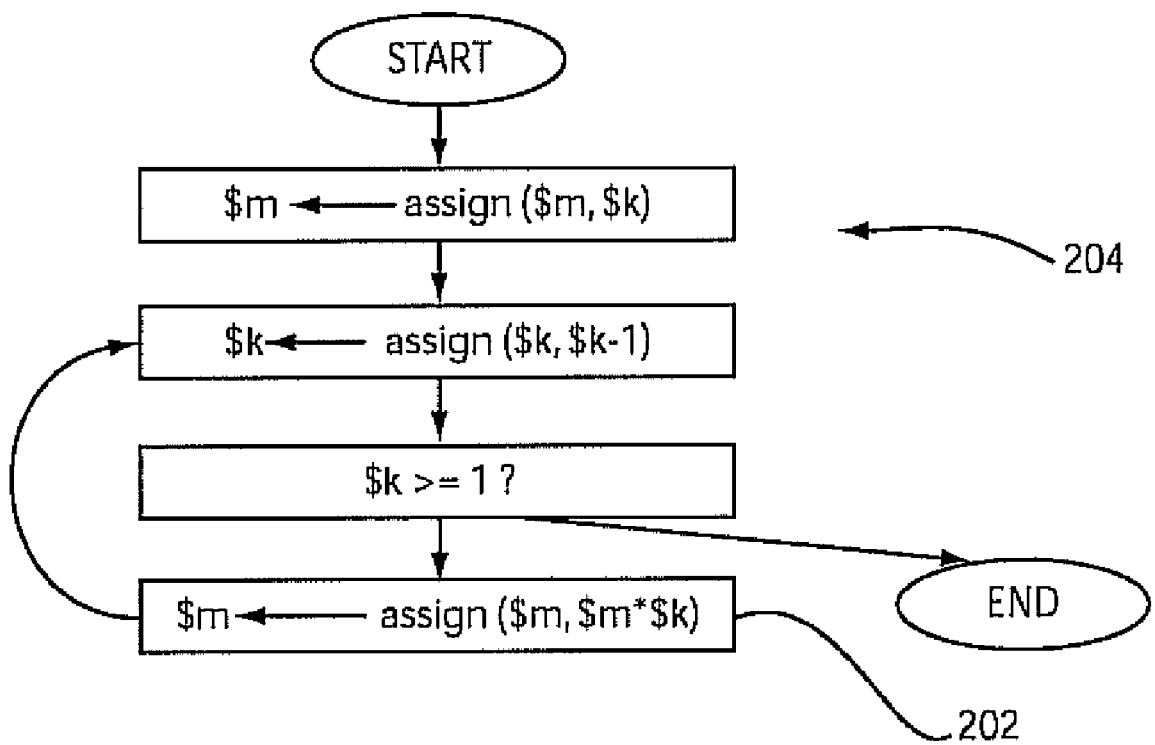
FIG. 3 is a diagram showing code where a special path is created for versioning in accordance with an illustrative embodiment.

Referring to FIG. 3, for example, if we know that a "while loop" 204 is typically executed when $k and $m are integer values, we create a special path 202 in the code, which we enter when preconditions for the path, i.e., $k: INT and $m: INT are met. In the special path 202, we can always assume that $k and $m are integers.

Hot type information can be gathered by profiling. We concentrate on scalar operators. The scalar operators include arithmetic operators, +, −, *, . . . comparison operators, ==, >=, . . . boolean operators &&, ||, etc. In the case of dynamic languages, typically such operators are 'overloaded'. For example, in PHP:
- 1+2=3 (Int)
- 1+0.1=1.1 (double)
- 1+0x7fffffff=2147483648.0 (double)
- 1+"0.1" (string)=1.1 (double)
- +array(1)+array(2)=array(1, 2) . . .

Such heavily overloaded operators are not likely implemented by IL (intermediate language) compiler instruction, but rather they become a function call, called a helper call. In the case of PHP, assignment also becomes a primitive operator, because of reference counting, and references. However, since the assignment operator has a polymorphic type: NON-REF x 'a→'a, we skip profiling assignment operators.

Now, we identify the use sites of the operators in the code, in the above examples, that is, $k−1, $k>=1, $m*$k, and several assign operators. Now, by interpreter or by code insertion by compiler, we check the types of inputs and outputs at each call site of helpers, and gather information about the types of values. Then, at the versioning phase in the JIT (Just-in-time) compilation, we use the most often used types as the hot types of operator uses.

Hot type information may also be gathered by inference. The hot type information may be gathered by combining heuristics and static analysis. Static analysis is cheaper than the dynamic profiling, and also can be enabled from the first compilation. We use some heuristics obtained from the knowledge of the language. In the case of PHP, typical uses of the "+" operator should be 1+2=3 (Int) or 1+0.1=1.1 (double). Also, other cases are less likely and do not have many chances to get gains from inlining since the string parsing, array operations, etc. are already heavy. Hence, we concentrate on the simple arithmetic cases.

We give an example of heuristics to infer hot types of arithmetic operators, +, −, *, and comparison operators ==, <=, < in PHP:
- If there are definitions of constant integer values, we identify their use sites.
- If there are definitions of constant double values, we identify their use sites. If use sites are arithmetic operators, the result of those operators are also considered the definitions of doubles.
- For arithmetic operators: if there are no definitions of double values flowing for the use sites of arithmetic operators, we infer that operators are used as TNT x TNT→TNT. Otherwise we infer them to be TNT x DBL→DBL, DBL x TNT→DBL or DBL x DBL→DBL according to the possible definition sites of the arguments.
- Comparison operators are often used with types other than numbers, so we infer them to be TNT x INT→BOOL, DBL x DBL→BOOL, etc. only when at least one of argument can be a number.

In the case of the above example, these heuristics infer that both $k−1 and $m*$k are likely to be used as TNT x TNT→TNT.

Referring again to FIG. 2, inserting guards will be described. After versioning, the guard operators are inserted into the hot path 106 of the code. There are preferably two places we insert guard operators: Guards for the 'unlikely return types' and Guards on the control path breaking preconditions. In PHP, guards for the 'unlikely return types' corresponds to the integer addition and multiplication, which may return the double values, when the result overflows. However, such an overflow is very rare, so that this case is handled by the cold path 108. Guards on the control path breaking preconditions are inserted by the DFA algorithm.

So the first step of the guard insertion is for guards for the 'unlikely return types'. The rule is: We insert guards if the operator may return the types of values different from their hot-return types. For the last example, such guards are inserted into the codes of FIG. 4 as shown in FIG. 5.

For the guards on the control path breaking preconditions, we have to be careful not to insert guards in unnecessary places. We use the 'fail early' policy, since if the guard fails, the problem is in the parameters to the function, rather than the variables appearing inside loops. For this, the method uses the 'backward' DFA. This is the method to insert guards on the control path breaking preconditions using the DFA algorithm.

Figure 4:
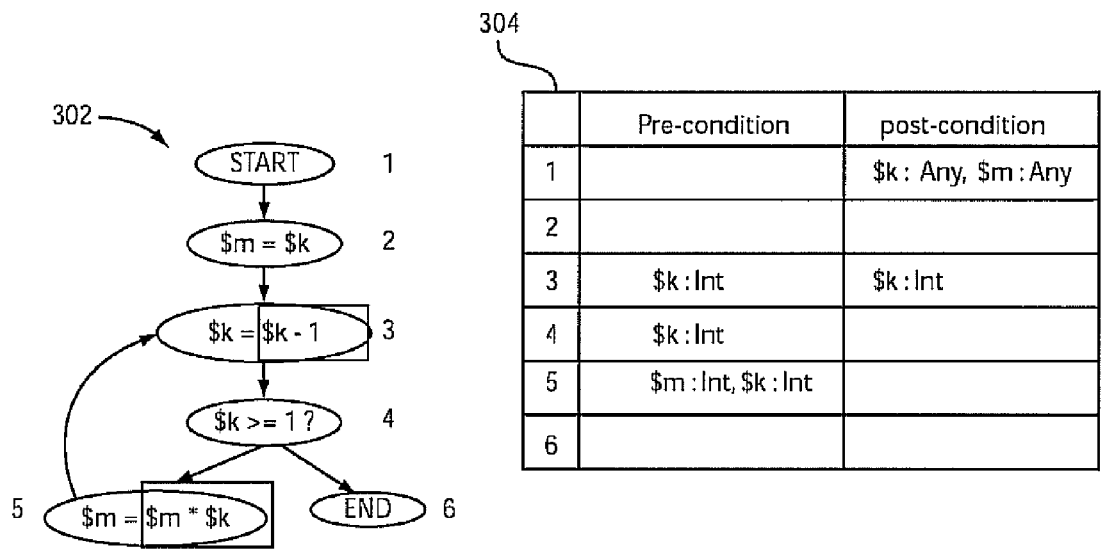
FIGS. 4 and 5 are diagrams showing data flow and the insertion of guard operators in program code in accordance with illustrative embodiments.
Figure 5:
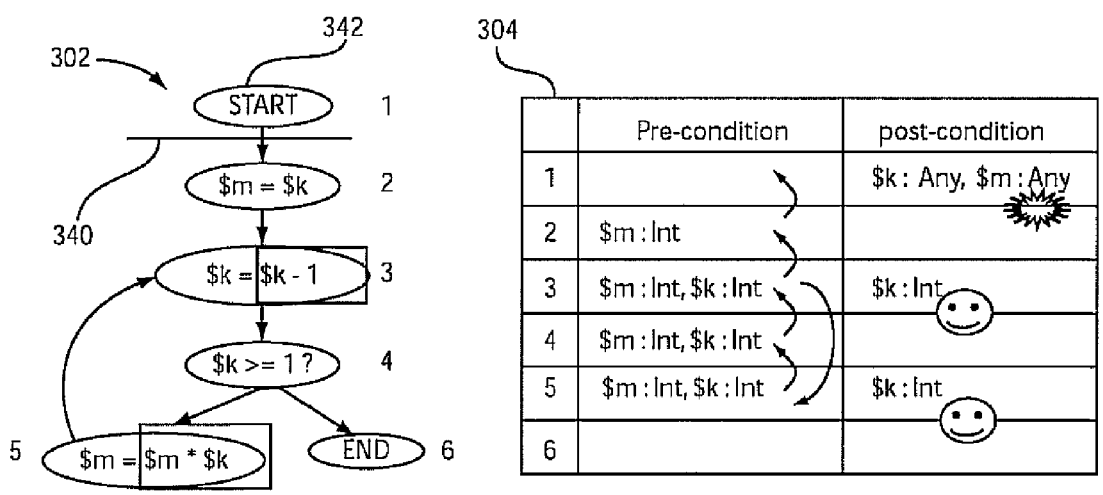

Referring to FIGS. 4 and 5, create a data-flow graph or SSA (Static Single Assignment) 302 for a given program to provide guards. Here, we assume SSA. A mapping 304 is computed where preconditions (PRE) and post-conditions are listed. Map PRE: VAR→TYPE. Start from expressions $m*$k where the use of * is inferred as INT x INT→INT. Then, let PRE($k)=INT, PRE($m)=INT. If there is $x←$y, propagate PRE($x) to PRE($y). If there is $x←phi($y, $z), propagate PRE($x) to PRE($y) and PRE($z). If $x←constant, check if PRE($x) is consistent with the type of value constant.

Such a propagation may fail, e.g., if PRE($y) is not more specific than PRE($x) at $x←$y. In such a case, we insert a guard operator. $x←guard$_{PRE(\$x)}$($y) which at runtime checks whether $y has type PRE($x) or not, and jumps out to the cold path, if not. The propagation is repeated until the fix-point is reached. In FIG. 5, the method proceeds as illustrated in the table 304, and inserts a guard 340, $m←guard$_{INT}$($m) right after a START block 342.

Versioning: The rest of the method is a transformation of the IL of the target function. We duplicate the control-flow-graph and add corresponding edges from the hot paths to the cold paths for each guard. If the code is large, we may add a reverse edge from the cold path to hot path, when all the preconditions to enter the hot path are met.

An embodiment of the versioning technique combined with compiler optimizations for a tag-word object model: The code after versioning is more eligible for radical optimizations using the known optimization techniques, such as constant propagation and dead store elimination. We first discuss the case where the values of PHP are represented by an unboxed tag-word object model. Although using the tag word is just space-inefficient, there are several reasons we use this model, we can reuse existing compilers not designed for tag-bit models easily. The "versioning" optimization helps most of tag words become constants in the hot paths of the code. Then, "constant propagation" optimization will remove the definitions of such tag-words. Hence, the resulting code can be made to not include the manipulation of tag-word at all in its hot-path.

Figure 6:
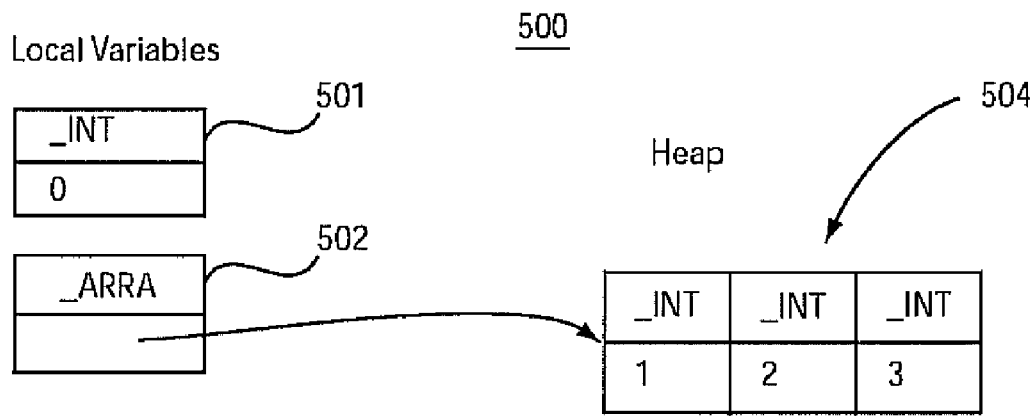
FIG. 6 is a diagram showing a compiler model layout in accordance with an illustrative embodiment.

Referring to FIG. 6, when seen from a compiler IL, an object layout 500 in this embodiment is as follows. Each value occupies two words 501 and 502 in the compiler IL. Also, each entry of an array 502 again occupies two-words in a heap 504. Note that this is only the compiler IL model, and actual representations can be different. For example, we can use tag-bit representation in the actual object layout, by allocation tag-bits on some designated registers. The first benefit of this embodiment is that this object layout can easily be built upon the existing compilers, using typed ILs. If we represent a value by a single word, then the compiler needs to prepare many analyses specific to the word.

A second benefit of this embodiment is ease of untagging. By constant propagation, we can erase manipulation of tag-words from the compiled code. For example, consider the following PHP program.

$x=1;
...
... =$x+2;

We use C-like pseudo code to show the result of compilation. The first line, i.e., $x=1, is compiled into the following in unboxed object model.

(1) x_tag=_INT;
x_val=1;
addop(x_tag, x_val, _INT, 2)

Then the constant propagation optimization can transform this program into the following form.

(2) x_tag=_INT;
x_val=1;
addop(_INT, 1, _INT, 2)

Now assume that the foo($x) is the only use of the value $x, in which case, the definition of x_tag in (1) becomes the dead store, so that will be removed.

(3) x_val =1;
addop(_INT, 1, _INT, 2);

As a result, x_tag is not even referred to in the above optimal code and provides the desired effect of untagging optimization. Also, addop is an overloaded function, which can be resolved when the tag value is known. If addop is resolved to addop$_{INT,INT}$, that corresponds to only a few machine instructions, so that we can inline this function.

However, without versioning optimization, this is only possible, when all inputs to addop are essentially constants. Now note that the versioning technique has fixed the types of values appearing in the hot path. Hence, in the hot-path it is very likely that we can inline the function as addop$_{INT,INT}$. This in effect translates the addop call to several machine instructions, manipulating on machine registers.

Embodiment for a boxed object model, or tag-bit object model: Similar effects of the versioning also apply to object models other than the tag word models. However, in this case, its effects are limited to inlining or devirtualization, and not that of optimizing value representation. This is different from the case of tag-word object models, in which the existing optimization automatically translates the values into their optimal form, except for the cases where values cannot fit the value-word, e.g., PHP doubles (64-bit double-precision (DBL) floating point numbers).

To get a benefit from optimal value representations even in such a case, we use an "untagging" or "unboxing" technique. In such a case, it is not automatic to get the optimal form, but we need to insert explicit conversions. For example, the following steps unbox PHP double values as depicted in FIG. 7.

Figure 7:
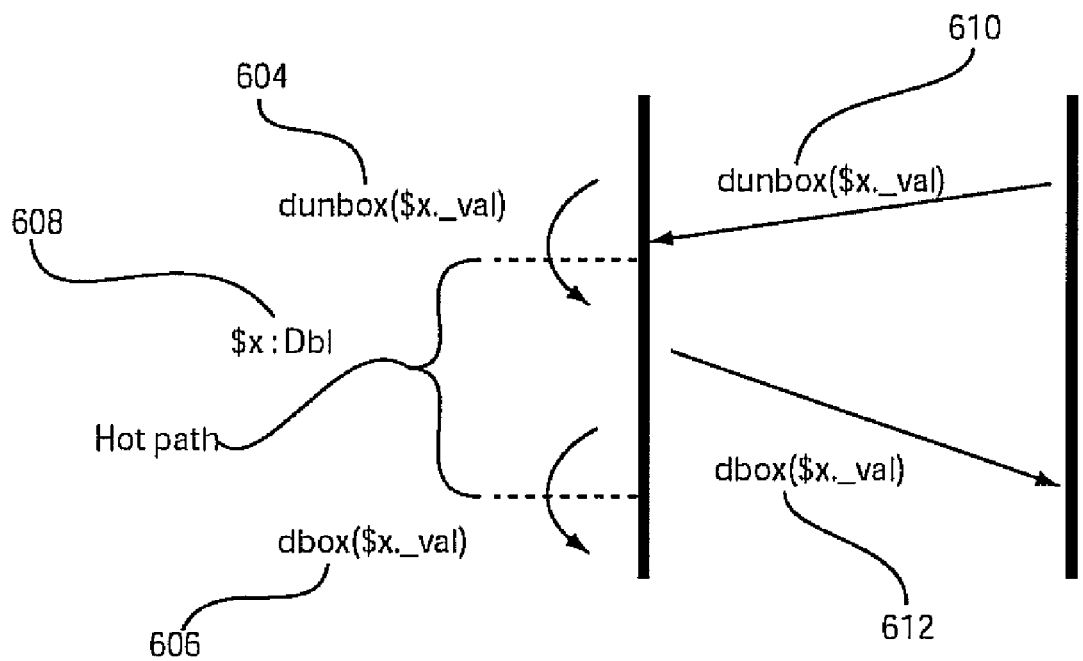
FIG. 7 is a diagram showing untagging/unboxing in accordance with an illustrative embodiment.

Referring to FIG. 7, we prepare several new helper functions 604 and 606, which are capable of translating heap allocated values to machine double values, and vice versa. These include dunbox and dbox. We prepare specialized versions 608 of double arithmetic operators. These directly correspond to machine double arithmetic instructions, and more optimal than the original add operators which involve heap maintenance when arguments are double values. These include, e.g., dadd, dsub, etc. After versioning, we first identify hot blocks in which we would like to use native double values, rather than boxed-values. Such blocks are determined by comparing the gains from using dadd, dsub, ... instead of add$_{DBL,DBL}$, sub$_{DBL,DBL}$, and so on, and the loss from additional conversions required, i.e., dunbox and dbox.

Once such hot blocks are determined, we insert a dunbox-operation 610 at each entrance of the hot blocks, and insert dbox 612 at the exit. We also replace all uses of add$_{DBL,DBL}$, sub$_{DBL,DBL}$ etc. with efficient versions, i.e., dadd, dsub. The problem of unboxing is that it also has costs. For example, consider the following code.

$x= ...
If (is_int($x)) {$x+=1};
If (is_int($x)) {$x+=2};
If (is_int($x)) {$x+=3};

In this code, the type of $x is unknown when we evaluate each is_int($x), but it is known when we evaluate each +=. Then, we may repeat boxing and unboxing each time it enters "{ ... }". In general, the cost of boxing and unboxing cannot be removed. A similar problem may occur with untagging.

Having described preferred embodiments of a system and method versioning optimization for dynamically-typed languages (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for optimizing program code in dynamically-typed languages, comprising:

gathering hot-type information from a program by employing at least one of inferencing and profiling to get the hot-type information for operator uses;

inserting guards in the program based on data flow in the program to guard against propagation failures during runtime where preconditions are violated or where the propagation is unlikely to return;

versioning the program in its entirety into global versions including a hot path version and a cold path version, where the hot path version is expected to be executed if the values of variables in the program code are expected types, and other exceptional cases are handled by the cold path version as triggered by the guards;

performing compiler optimizations to remove redundant representations of values, and heavy overloading of operators to provide an optimized compiling of the program code; and combining untagging and unboxing techniques to obtain optimal representations, if needed.

* * * * *